United States Patent [19]

Rosaen

[11] Patent Number: 4,622,994
[45] Date of Patent: Nov. 18, 1986

[54] FLUID HANDLING DEVICE

[76] Inventor: Nils O. Rosaen, 2139 Heide, Troy, Mich. 48084

[21] Appl. No.: 720,452

[22] Filed: Apr. 8, 1985

Related U.S. Application Data

[63] Continuation of Ser. No. 523,109, Aug. 15, 1984, abandoned.

[51] Int. Cl.$^4$ ............................................. F16K 37/00
[52] U.S. Cl. ................................ 137/557; 137/543.13; 137/543.23; 137/554; 116/271; 73/744
[58] Field of Search ........... 137/553, 557, 542, 543.13, 137/543.23; 116/DIG. 7, DIG. 21, 271, 274, 277; 73/744

[56] References Cited

U.S. PATENT DOCUMENTS

| | | | |
|---|---|---|---|
| 311,833 | 2/1885 | Hoxie | 137/542 |
| 1,675,849 | 7/1928 | Fultz | 137/557 |
| 2,853,880 | 9/1958 | Redding | 73/744 |
| 2,879,794 | 3/1959 | Costello | 137/542 |
| 3,039,658 | 6/1962 | Hoelle | 137/543.13 |
| 3,422,791 | 1/1969 | Rosaen | 116/271 |
| 3,707,987 | 1/1973 | Gordon | 137/543.23 |

FOREIGN PATENT DOCUMENTS 1394120  5/1975  United Kingdom ................ 137/542

Primary Examiner—A. Michael Chambers
Attorney, Agent, or Firm—Gifford, Groh, VanOphem, Sheridan, Sprinkle & Dolgorukov

[57] ABSTRACT

The present invention provides a fluid handling device which operates as a combination check valve and fluid flow meter. The fluid handling device comprises a housing having an inlet, an outlet and a fluid passageway formed therebetween. A valve seat is contained within the housing in series with the fluid passageway while a valve member cooperates with the valve seat and is movable between an open and a closed position. A compression spring urges the valve member towards its closed position so that whenever the fluid pressure at the outlet exceeds the fluid pressure at the inlet, the valve moves to its closed position thus preventing reverse fluid flow through the device. Preferably, a tapered surface on the valve member forms a variable area opening at the valve seat which increases in area as the valve member moves from its closed and towards its open position. An indicator needle is mechanically connected to the valve member to produce an exteriorly visible signal of the position of the valve member which, in turn, is representative of the fluid flow rate through the fluid handling device.

8 Claims, 4 Drawing Figures

FLUID HANDLING DEVICE

This application is a continuation of application Ser. No. 523,109, filed Aug. 15, 1984 now abandoned.

BACKGROUND OF THE INVENTION

I. Field of the Invention

The present invention relates generally to fluid handling devices and, more particularly, to a combination check valve and flow meter.

II. Description of the Prior Art

There are a number of previously known check valves which use a spring biased valve member to prevent reverse flow through the valve. Similarly, there are a number of previously known fluid flow meters which employ a variable area orifice for measuring the fluid flow rate. Many of these previously known fluid flow meters employ a pivotal vane or a tapered needle to vary the area of the orifice.

There are, however, no devices known to Applicant which provide a combination check valve and fluid flow meter and which utilize the check valve as the means for measuring the flow rate through the device.

SUMMARY OF THE PRESENT INVENTION

The present invention provides a combination check valve and fluid flow meter.

In brief, the device of the present invention comprises a housing having an inlet, an outlet and a fluid passage formed therebetween. A cooperating valve member and valve seat are contained within the housing so that the valve seat forms a fluid port in series with the fluid passageway. The valve member is movable between an open and a closed position with respect to the seat so that, with the valve member in its closed position, the valve member closes the fluid port and prevents reverse fluid flow through the fluid passageway. A spring urges the valve member towards its closed position while fluid flow from the inlet and to the outlet moves the valve member against the force of the spring and to its open position.

The valve member includes a tapered or frustoconical surface which cooperates with a cylindrical surface at the valve seat to provide a variable area opening between the valve seat and the valve member. The area of this opening increases substantially linearly with the movement of the valve member from its closed and towards its open position.

An indicator assembly is mechanically coupled to the valve member to produce a signal visible exteriorly of the housing of the position of the valve member and thus representative of the fluid flow rate through the device. In the preferred form of the invention, the indicating means includes an indicator shaft rotatably mounted to and extending from the interior to the exterior of the housing. An arm is secured to the interior end of the shaft and abuts against the valve member so that movement of the valve member rotates the indicator shaft through the arm. An indicator needle is secured to the other or exterior end of the indicator shaft and cooperates with an indicia plate secured to the housing to provide a signal of the rotational position of the shaft and thus of the fluid flow rate through the device.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
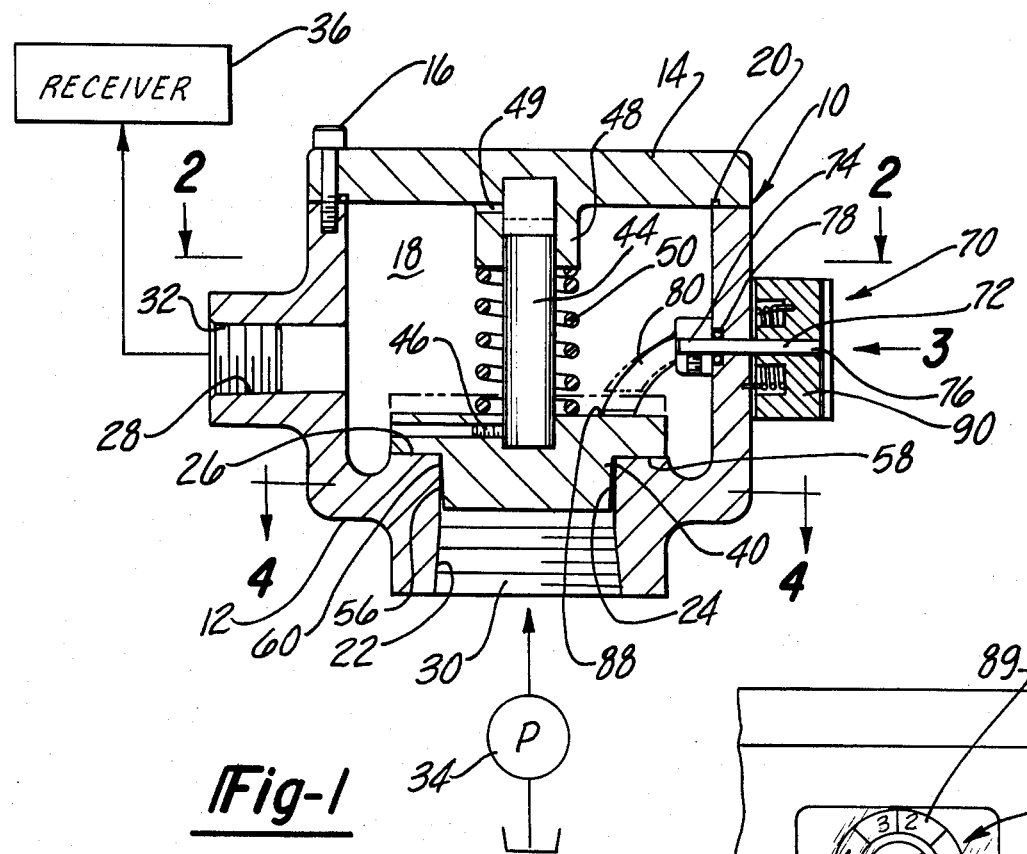
FIG. 1 is a cross sectional view illustrating a preferred embodiment of the present invention.

With reference first to FIG. 1, a preferred embodiment of the fluid handling device of the present invention is thereshown and comprises a housing 10. The housing 10 includes both a body 12 and a cover 14 which is secured to the body 12 by conventional fasteners, such as bolts 16. With the cover 14 secured to the body 12, the housing 10 forms an interior housing chamber 18 and a fluid seal 20 between the cover 14 and body 12 prevents fluid leakage therebetween.

Still referring to FIG. 1, an inlet 22 having a cylindrical interior surface 24 is formed at the bottom of the body 12. The inlet 22 is open to the housing chamber 18 through an annular valve seat 26 which extends generally radially outwardly with respect to the cylindrical surface 24. A fluid outlet 28 is formed on one side of the body 12 which is also open to the housing chamber 18 so that the housing chamber 18 forms a fluid passage between the inlet 22 and outlet 28. Both the inlet 22 and outlet 28 are internally threaded at 30 and 32, respectively, for connection with standard fittings. A pump 34 is fluidly connected to the inlet 22 while a fluid receiver 36 is fluidly connected to the outlet 28.

Still referring to FIG. 1, a generally cylindrical valve member 40 is secured to one end of an elongated guide pin 44 by a set screw 46 so that the guide pin 44 extends substantially axially outwardly from the top of the valve member 40. The other end of the guide pin 44 is axially slidably mounted within a boss 48 having a pressure relief port 49 formed on the cover 14 so that the guide pin 44 and valve member 40 are aligned with the inlet 22. A compression spring 50 extends around the guide pin 44 and is entrapped between the boss 48 and the valve member 40 and resiliently urges the valve member 40 towards the inlet 22 and against the valve seat 26.

The valve member 40 includes a reduced diameter frusto-conical or tapered portion 56 having an outer conical surface at its lower end. Thus, with the valve member 40 in its closed position as shown in solid line in FIG. 1, an outer annular abutment surface 58 on the valve member 40 abuts against the valve seat 26 and, simultaneously, the frusto-conical portion 56 extends into the inlet 22. With the valve member 40 in its closed position the outer surface of the frusto-conical portion 56 is spaced inwardly from the inlet cylindrical surface 24.

Figure 2:
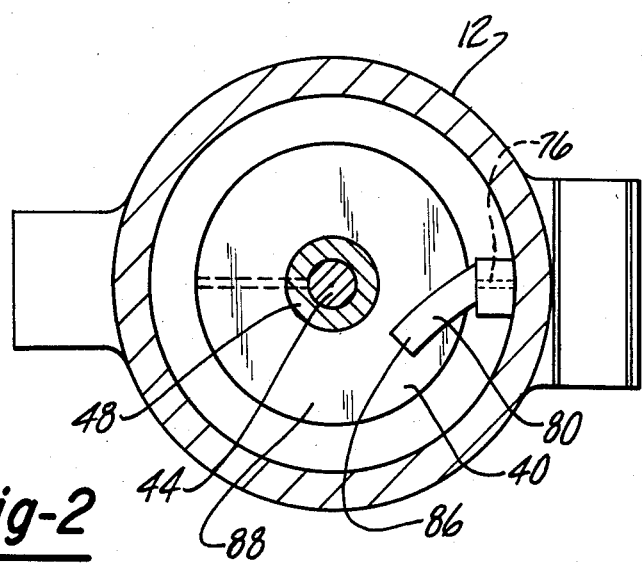
FIG. 2 is a view taken substantially along line 2—2 in FIG. 1 and with parts removed for clarity.
Figure 4:
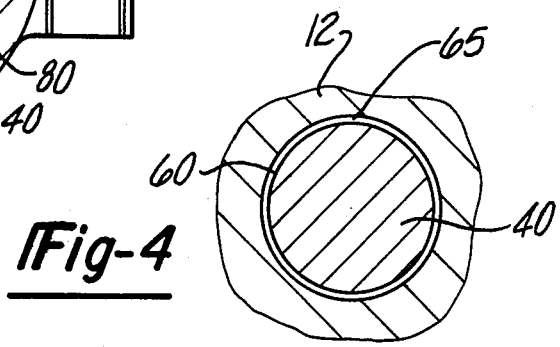
FIG. 4 is a view taken substantially along line 4—4 in FIG. 1 and with the valve in its open position.

With reference now to FIGS. 1, 2 and 4, the valve member 40 is movable between a closed position, shown in solid line in FIG. 1, and an open position, shown in phantom line in FIG. 1. With the valve member 40 in its open position, the valve member 40 forms an annular opening 65 (FIG. 4) between the valve member 40 and its seat 26 thus establishing fluid communication between the inlet 22 and outlet 28. Conversely, with the valve member in its closed position (FIG. 1), the valve member 40 blocks fluid flow between the inlet 22 and outlet 28.

The frusto-conical valve member portion 56 cooperates with the cylindrical surface 24 at the valve seat 26 to form the annular opening 65 which varies in area in dependence upon the position of the valve member 40. Thus, with the valve member 40 only slightly opened, the area of the opening 65 is relatively small. Conversely, as the valve 40 member moves towards a more open position, the space in between the valve member conical surface 60 and the inlet cylindrical surface 24 increases thus providing an annular opening 65 of greater area.

In operation, fluid flow from the pump 34 to the inlet 22 forces the valve member 40 upwardly against the force of the compression spring 50 thus opening the valve member 40 and enabling fluid to flow from the inlet 22 to the outlet 28 and ultimately to fluid receiver 36. The influent urges the valve member 40 toward its open position until the area of the opening 65 is sufficient to accomodate the fluid flow rate into the housing inlet 22. Consequently, the position of the valve member 40 is representative of the fluid flow rate through the fluid handling device.

Figure 3:
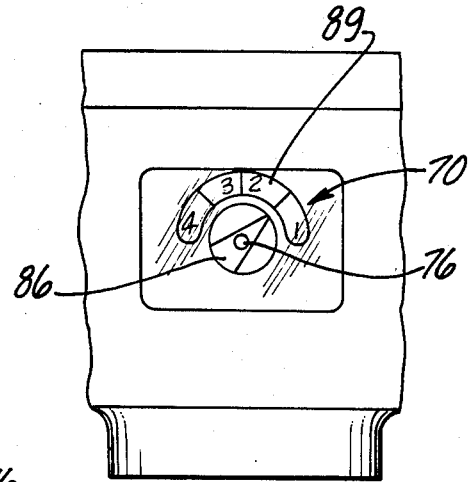
FIG. 3 is a view taken along arrow 3 in FIG. 1.

With reference now particularly to FIGS. 1, 2 and 3, an indicator assembly 70 provides a signal visible exteriorly of the housing 10 of the position of the valve member 40 and thus of the fluid flow rate through the device. The indicator assembly 70 is conventional in construction and includes a indicator shaft 72 rotatably mounted to the housing 10 so that one end 74 of the shaft is positioned within the housing chamber 18 while its other end 76 is positioned outside the housing 10. A fluid seal 78 (FIG. 1) prevents fluid leakage from the housing chamber 18 along the shaft 72.

An arm 80 is secured to the inner shaft end 74 and has a portion 86 radially offset from the axis of the shaft 72 which abuts against the top 88 of the valve member 40. Thus, axial movement of the valve member 40 rotates the shaft 72 via the arm 84.

As best shown in FIG. 3, an indicator needle 86 is secured to the outer shaft end 76 and cooperates with an indicia plate 89 mounted to the housing 10. The indicia plate 89 is calibrated in fluid flow rate units corresponding to the axial position of the valve member in the well known fashion. In addition, a biasing assembly 90 maintains the arm 80 in contact with the upper surface 88 of the valve member 40.

In operation, the fluid flow rate from the pump 34 to the inlet 22 forces the valve member 40 to an open position against the force of the compression spring in the previously described fashion. The axial position of the valve member 40 varies directly with the fluid flow rate from the pump 34 and this fluid flow rate is displayed by the indicator assembly 70.

In the event that the fluid pressure ceases at the housing inlet 22, the force of the compression spring forces the valve member 40 to its closed position and thus against the valve seat 26. In doing so, the valve member 40 acts as a check valve and prevents any reverse fluid flow through the device.

From the foregoing, it can be seen that the present invention provides a simple, inexpensive and yet highly effective combination check valve and fluid flow meter.

Having described my invention, however, many modifications thereto will become apparent to those skilled in the art to which it pertains without deviation from the spirit of the invention as defined by the scope of the appended claims.

I claim:

1. A fluid handling device comprising:
   a housing having an inlet, an outlet and a fluid passageway between said inlet and outlet,
   check valve means for preventing fluid flow through said passageway from said outlet and to said inlet, said valve means comprising a valve member and a valve seat contained in said housing, said valve seat forming a port in series with said fluid passageway, said valve member movable between a fully open and a fully closed position with respect to said valve seat, said movement of said valve member between said fully open and said fully closed position forming the entire range of travel of said valve member,
   means for urging said valve member towards said closed position,
   means for indicating the position of said valve member along the entire range of travel of the valve member exteriorly of said housing, said indicating means mounted to said housing radially outwardly from said check valve means,
   wherein said valve member includes a surface which cooperates with a surface of said valve seat to form an opening between said surfaces which opening proportionally increases in area as said valve member moves from its closed towards its open position, and
   whereby said indicating means indicates the position of said valve member between said fully open and said fully closed position to thereby indicate the changes in the area of said opening as said valve member moves from its closed toward its open position so that said indicating means is operable to indicate the change in the flow rate of fluid flowing through said device.

2. The invention as defined in claim 1 wherein said valve seat surface is substantially cylindrical, said fluid passageway extending through said valve seat, and wherein said valve member surface is substantially frusto-conical in shape, said valve member surface being spaced inwardly from said valve seat surface.

3. The invention as defined in claim 1 wherein said valve member surface is tapered.

4. The invention as defined in claim 2 wherein said valve seat and said valve member are aligned with said housing inlet.

5. The invention as defined in claim 4 wherein said valve seat comprises an annular abutment surface which extends radially outwardly from said cylindrical surface, and wherein said valve member comprises an annular enlargment which abuts against said annular abutment surface when said valve member is in said closed position.

6. The invention as defined in claim 1 wherein the area of said opening varies linearly with the movement of said valve member.

7. The invention as defined in claim 1 wherein said indicating means comprises a shaft rotatably mounted about an axis to said housing, said shaft having one end interior of said housing and its other end exterior of said housing, an arm secured to said one end of said shaft, said arm having a portion radially offset from the axis of said shaft which abuts against said valve member, an indicator needle secured to said other end of said shaft, and means for urging said arm against said valve member.

8. The invention as defined in claim 1 and comprising an elongated guide pin having one end secured to said valve member and its other end slidably received within a receiving bore in said housing, and wherein said urging means comprises a compression spring extending around said guide pin and entrapped between said housing and said valve member.

* * * * *